July 17, 1956
H. C. CHILDS
2,754,907
PICKING UP SCRAP RING RESULTING FROM
EXTRUSION OF TUBULAR ARTICLES
Filed Oct. 2, 1950
4 Sheets-Sheet 2
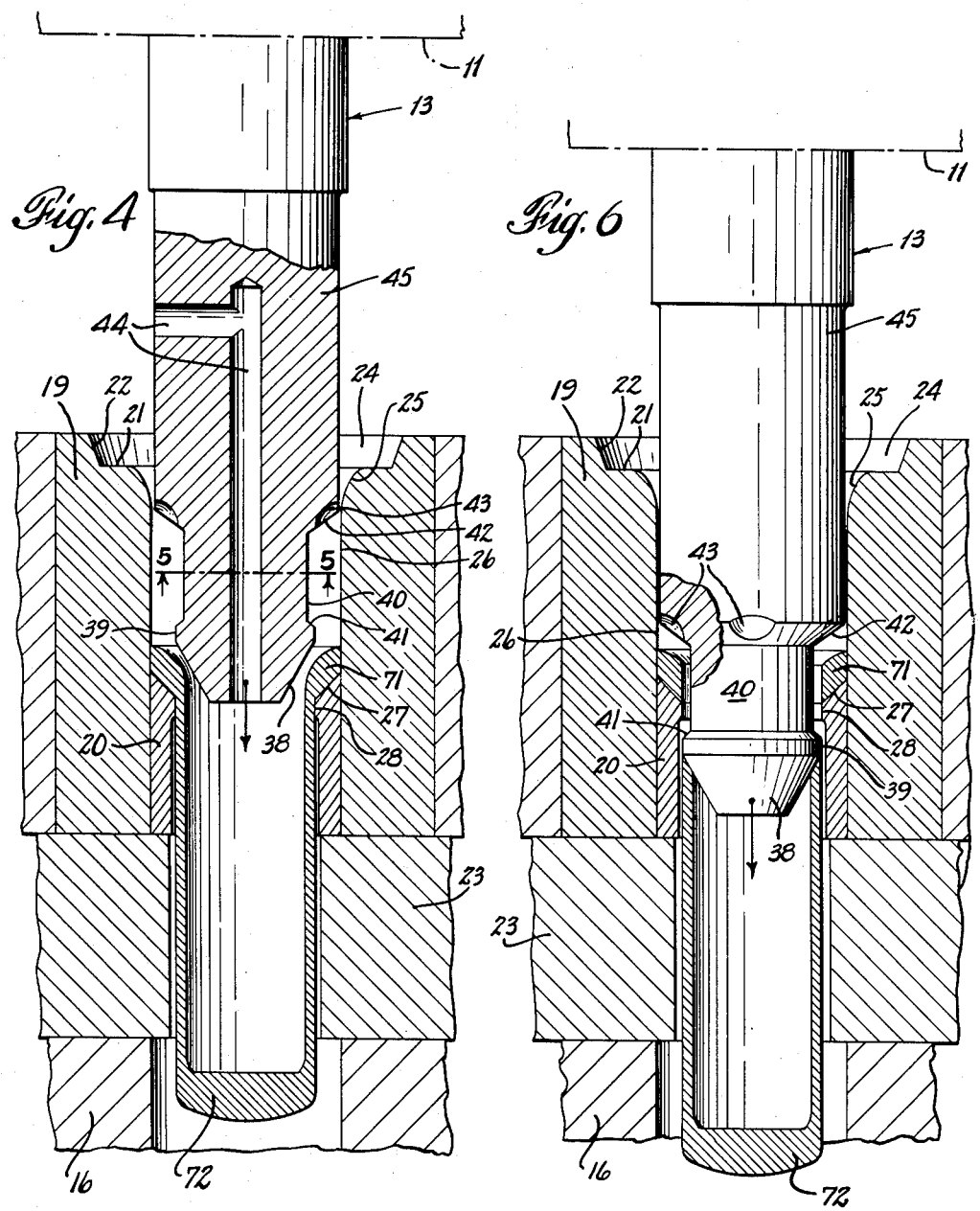
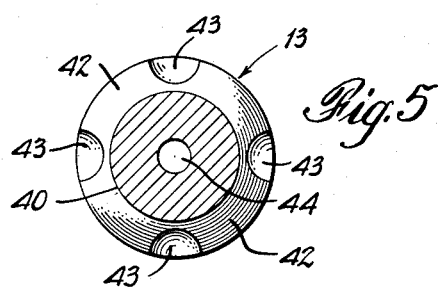
INVENTOR.
HERBERT C. CHILDS
BY
Harold F. Wilhelm
ATTORNEY.

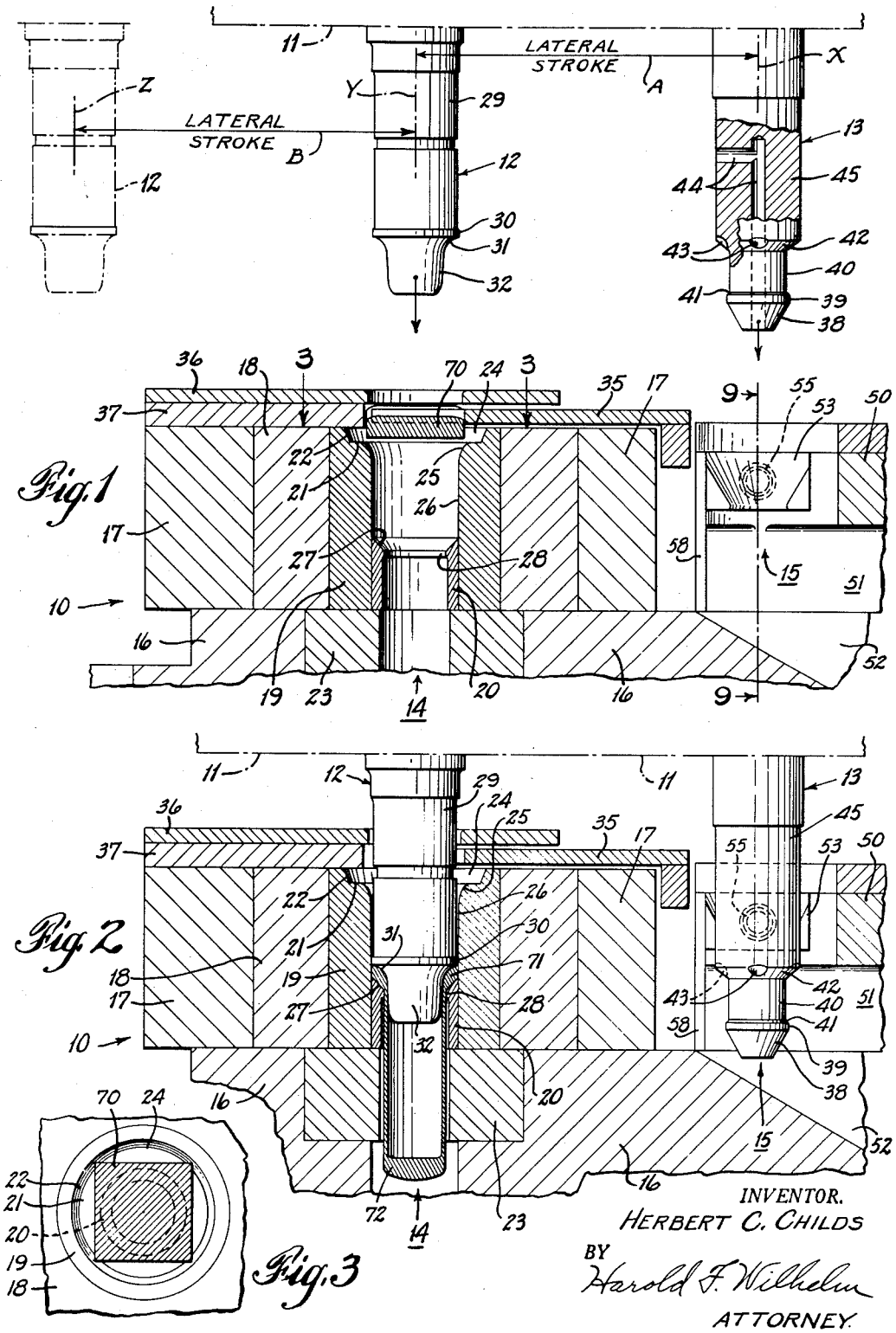

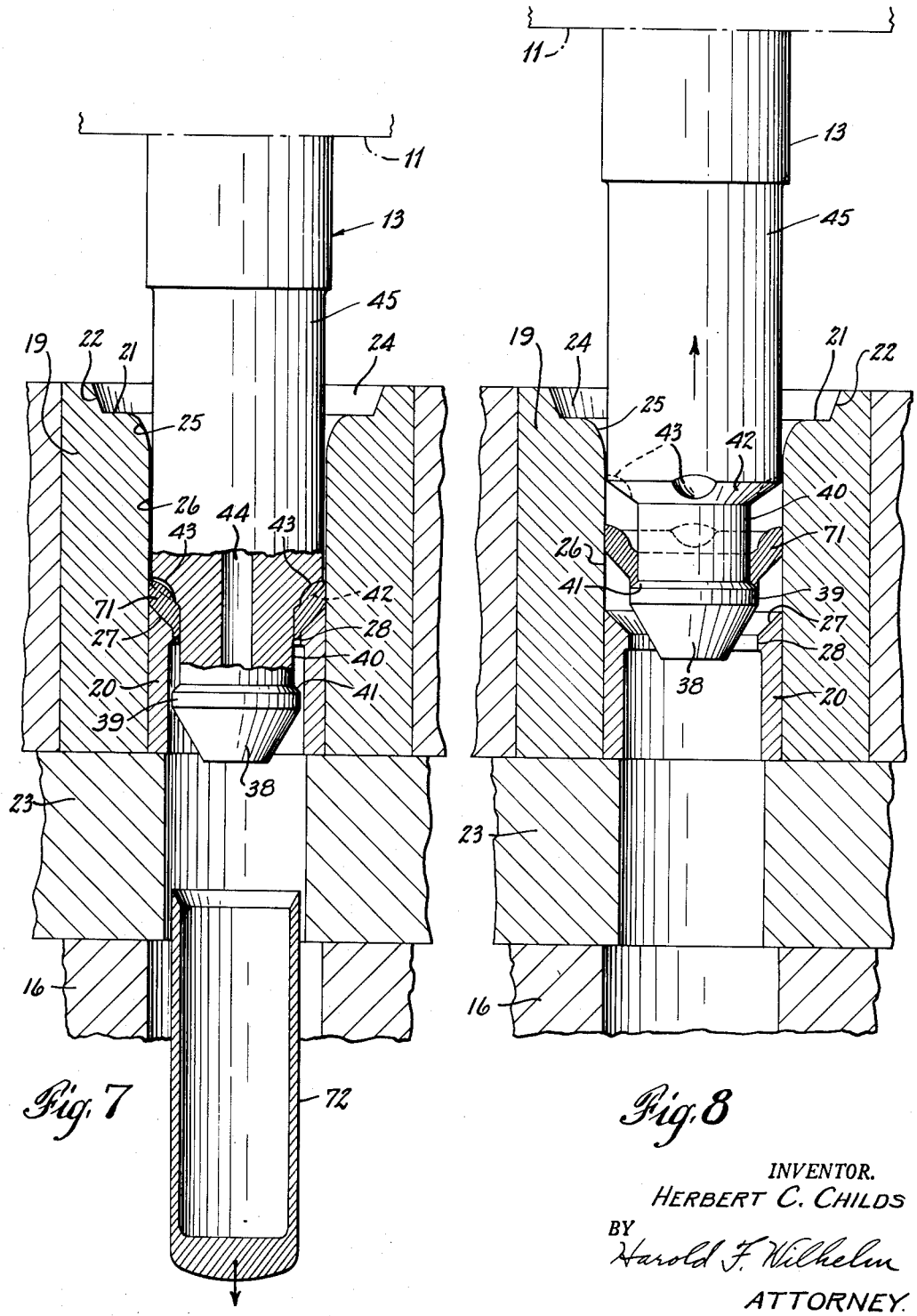

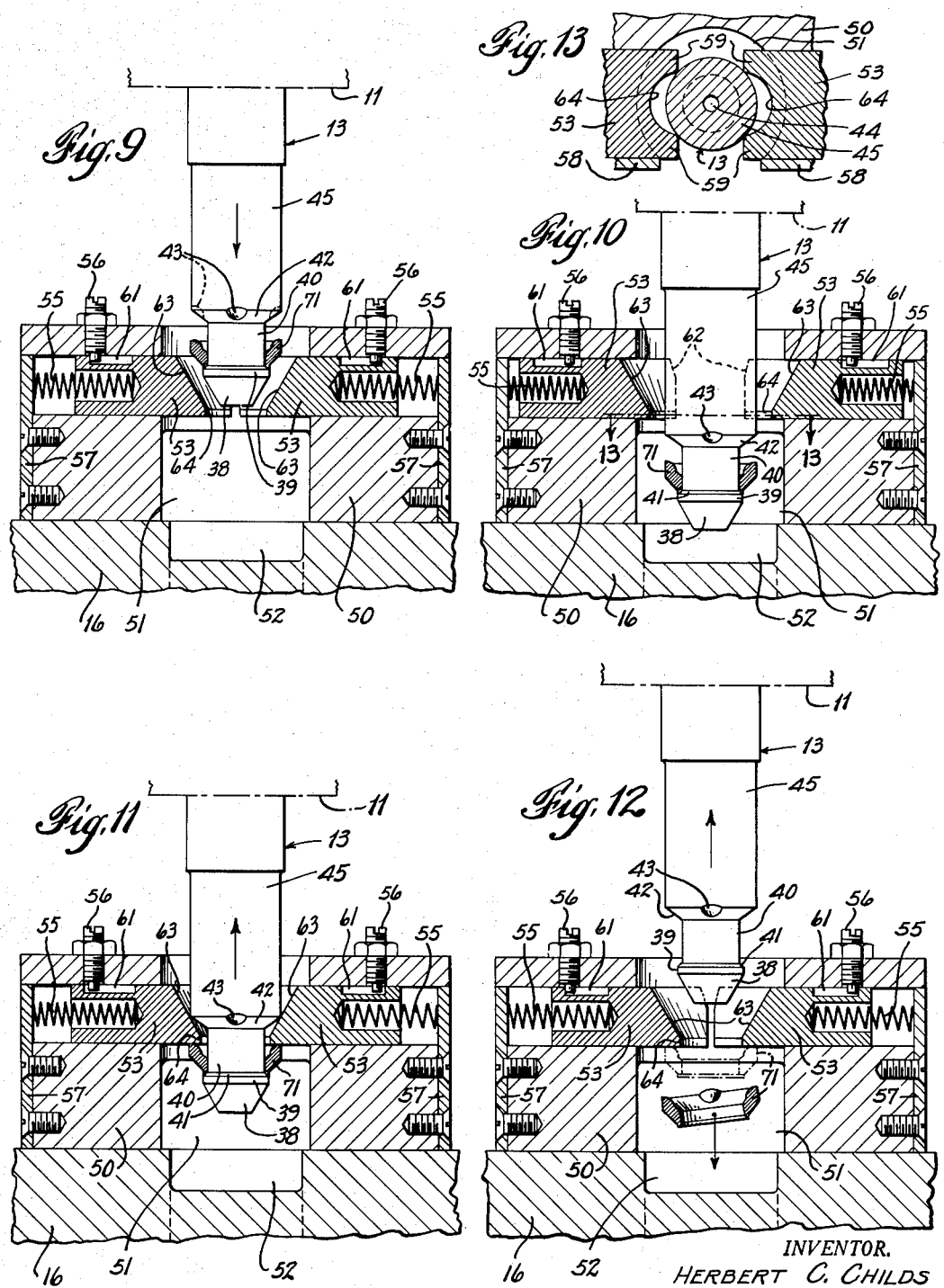

United States Patent Office 2,754,907
Patented July 17, 1956

2,754,907

PICKING UP SCRAP RING RESULTING FROM EXTRUSION OF TUBULAR ARTICLES

Herbert C. Childs, Southport, Conn., assignor to Olin Mathieson Chemical Corporation, a corporation of Virginia Application October 2, 1950, Serial No. 188,049

3 Claims. (Cl. 164—29)

The invention relates to the impact extrusion of tubular articles, such as used in the manufacture of cartridge shells, and more particularly to the trimming of the scrap ring from the end product of the machine.

The present invention is particularly useful with an impact extruding method and apparatus such as disclosed in application, Serial No. 774,913, filed September 19, 1947, in the name of Emile Blair, now Patent No. 2,630,916, issued March 10, 1953, although not limited to such use.

The Blair application relates to the cupping and extrusion of a tubular article from a polygonal blank, in a single pass of the press. After the blank is extruded, it is necessary to sever the scrap ring from the tubular end product of the machine. The scrap ring is removed from the extrusion die by a separate trimming punch, on its upward stroke; the scrap ring is stripped from the trimming punch by passing the latter down into, and up out of, suitable stripping apparatus. In certain cases trouble has been encountered by failure of the trimming punch to pick up the scrap ring on its upward stroke out of the extrusion die, or by the scrap ring dropping off the punch prematurely, after being picked up. Such difficulties are aggravated when the amount of metal in the scrap ring is increased. Such prior apparatus uses the "spring-back" of the metal in the scrap ring to hold it onto the trimming punch until the scrap ring is positively stripped from the trimming punch.

An important object of the present invention is to overcome such difficulties in a simple and expeditious manner.

According to a preferred form of the present invention, a special trimming punch is provided having, in addition to its shear edge, a swaging surface which swages the scrap ring after the tubular end product is severed. The swaging surface has adjacent thereto a shank recess of reduced diameter into which the metal of the scrap ring is squeezed. The swaging surface may also have overflow notches to take care of any excess metal in the scrap ring and thus avoid tremendous pressures which might otherwise arise, were all of the excess metal to be pushed against an unrelieved swaging surface. The swaging of the scrap ring helps loosen the outer edges of the ring from the surface of the extrusion die, making it easier to remove the scrap ring from the die. The swaging also positively squeezes the metal into the shank recess where it is positively engaged by the punch shoulder on which the severing edge is located, thus preventing the ring from slipping off the punch. The invention provides a positive engagement or interlock between the scrap ring and the punch and does not rely upon the spring-back of the scrap ring.

The invention also consists in certain new and original features and combinations hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompany drawings forming a part hereof, in which—

Fig. 1 is a fragmentary transverse section through the die block and punches of a press having an extruding station and a stripping station. This figure shows a square blank in the centering nest of the extrusion die. The figure illustrates the parts just before the punches descend to cup the blank and extrude it into a tubular shell;

Fig. 2 is a view corresponding to Fig. 1, but showing the punches at their lowermost position. The shell is shown completely extruded, but before the scrap ring is removed;

Fig. 3 is a fragmentary plan section, taken on the line 3—3 of Fig. 1, and illustrating how a square blank fits in the round centering nest of the extrusion die;

Fig. 4 is an enlarged vertical section of the press showing the trimming punch at the extruding station. The punch is shown on its downward stroke, just prior to its contact with the extruded product to sever the scrap ring;

Fig. 5 is a plan section, on the line 5—5 of Fig. 4, illustrating the swaging surface and the overflow recesses on the trimming punch;

Fig. 6 is a view, corresponding to Fig. 4, but showing the position of the trimming punch just after severing the extruded product from the scrap ring, and just before the scrap ring is engaged by the swaging surface of the punch;

Fig. 7 is a view corresponding to Fig. 6, showing the position of the trimming punch at the end of its downward stroke. This illustrates how the scrap ring is swaged, and how some of the metal may flow downwardly in between the punch and the die, and how some of the metal may flow up into the overflow recesses;

Fig. 8 is a view corresponding to Fig. 7, but showing the trimming punch on its upward stroke. It illustrates how the lower shoulder eventually picks up the scrap ring and lifts it off the extrusion bushing surface;

Fig. 9 is a vertical section through the stripping station, looking in the direction indicated by the line 9—9 of Fig. 1. It shows the position of the trimming punch after it has moved over from the extrusion station to the stripping station. It shows the trimming punch with the scrap ring thereon on its way down into the stripping devices;

Fig. 10 is a view corresponding to Fig. 9, showing the trimming punch carrying the scrap ring at its lowermost position, after it has passed through the stripping jaws;

Fig. 11 is a view corresponding to Fig. 10, showing the trimming punch on its upward stroke after the spring-pressed stripping jaws have entered the space between the swaging surface and the scrap ring;

Fig. 12 is a view corresponding to Fig. 11 and showing the position of the trimming punch after the stripping jaws have removed the scrap ring from the punch; and Fig. 13 is a plan section, taken on the line 13—13 of Fig. 10, illustrating the relationship between the stripping jaws and the punch, and showing the stripping jaws at their full retracted position.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring to the drawings, the preferred manner of practicing the present invention will be briefly described before describing the structure and operation in detail.

The square flat blank 70 is fed into the centering nest 24 (Fig. 1) either by hand, or by suitable automatic apparatus. The head of the press then moves downwardly; the extrusion punch 12 first cups the blank and then extrudes the metal of the cup to form the product shown in Fig. 2. This product consists of the scrap ring 71 and the end product 72 of the machine, which in the present form is a tubular shell which may be further processed into cartridges. The head 11 is then raised and shifted laterally, to the left, as indicated by the arrows A and B, in Fig. 1. This brings the trimming punch 13 in line with the extrusion die. The head 11 again moves downwardly; the trimming punch 13 severs the end product 72 from the scrap ring 71 (see Fig. 6) and then swages or compresses the scrap ring 71 (see Fig. 7). The head 11 then moves upwardly, the punch raising the scrap ring with it, as illustrated in Fig. 8. The head 11 then moves laterally, to the right in Fig. 1, as indicated by the arrows A and B, bringing the trimming punch in line with the trimming apparatus, which position is indicated in Fig. 1. The head 11 then moves downwardly. The trimming punch enters the stripping devices, occupying the successive positions shown in Figs. 9 to 12. When the trimming punch rises, the scrap ring 71 is stripped from the punch, falling into the delivery chute 52, as indicated particularly in Fig. 12.

The structure of the press will now be described.

The press comprises, in general, a stationary die 10 and a movable head 11. The mounting of die 10 and head 11 is shown somewhat diagrammatically and incomplete since the particular mounting of the punches and of the die and stripping devices on the press forms no part of the present invention, except in combination with the particular details of construction described hereinafter. The press may be of any well known type; the head 11 may be, for example, toggle actuated, hydraulically actuated, or crank actuated; the latter is preferred at the present time.

The movable head 11 carries punches 12 and 13. The stationary die carries an extrusion station or die 14 and a stripping station 15. The head reciprocates vertically by well known apparatus, not shown. The head 11 also reciprocates horizontally, as indicated by the arrows A and B in Fig. 1 by well known apparatus, not shown. The horizontal reciprocation of the head successively brings the extrusion punch 12 and trimming punch 13 in line with the extrusion die 14.

The stationary die 10 comprises a suitable support 16 which may form part of the stationary frame of the machine. It carries the extrusion die 14 and the stripping apparatus 15.

The extrusion die 14 has base sections 17 and 18 resting upon the support 16; it comprises an extrusion ring 19 which rests upon a reinforcing block 23. The extrusion ring 19 carries an extrusion bushing 20.

The extrusion ring 19 has a cylindrical bore 26 having a flaring mouth 25. Above mouth 25 is a centering nest 24 having a tapering side wall. The extrusion bushing 20 has a beveled annular squeeze surface 27 and an annular extrusion flange 28. All parts are circular in section.

If desired, automatic feed devices may be provided for feeding the square blanks to the nesting seat 24. For this purpose a reciprocating feed plate 35 is provided. This feed plate reciprocates in a direction perpendicular to the plane of the paper in Fig. 1 to advance the square blanks 70, one by one, at the proper time to the centering nest 24. A spacer plate 37 is mounted on the die and a top plate 36 is mounted over the spacer plate; these provide a horizontally extending slot in which the reciprocating feed plate 35 moves to feed the blanks 70 to the centering nest 24.

The tapered side walls 22 of the centering nest 24 act to insure centering of a square or other polygonal blank in the circular seat so that the extruded product will be symmetrical. It will be understood that, due to tolerance variations and other causes, all of the blanks may not be exactly the same size. The blanks 70 may vary, for example, from a minimum size in which the four corners seat snugly in the centering nest 24 against the bottom 21, to a size in which the blank 70 will have certain corners at the bottom 21 of the centering nest and other corners part way up the tapered side wall 22.

If desired, the automatic feeding apparatus may be eliminated and the blanks fed by hand. The construction of the automatic feeding apparatus and of the nesting seat is described and claimed in copending application, Serial No. 191,622 filed October 23, 1950, in the name of George A. Foisy, now Patent No. 2,673,644 granted March 30, 1954.

The extrusion punch 12 comprises a shank 29 having a centering flange 30 which fits in the circular bore 26. The punch 12 carries a beveled or tapered squeeze surface 31 and a tapered former or plug 32.

It will be noted that both the die squeeze surface 27 and the punch squeeze surface 31 are beveled and that the bevel of the plunger squeeze surface is, in general, flatter than the bevel of the die squeeze surface. This facilitates extrusion of the metal, as will be more apparent as the description proceeds.

The trimming punch 13 has a conical nose 38 adjoining a shear flange 39; it also has a shank recess 40 connected by a slight annular bevel 41 to shear flange 39. Trimming punch 13 has an annular beveled swaging surface 42 with a plurality of overflow notches 43 adjacent shank 45. It has bored relief holes 44 to relieve pressure in case any oil is trapped between the punch and the extruded product. The overflow notches 43 are shown as four in number, see Fig. 5; but six and eight or a larger number may also be used. In fact, in some cases the overflow notches 43 may be eliminated entirely, in which case the swaging surface 42 will be continuous circumferentially. It will be noted that the bevel of the annular swaging surface is flatter than the bevel of die squeeze surface 27 (see Fig. 6). This facilitates flow of the metal of the scrap ring as explained hereinafter.

The stripping apparatus 15 will now be described with particular reference to Figs. 9 to 13. The die support 16 supports a stripper assembly. The assembly comprises a block 50 having a vertical opening 51 in line with the punch 13 when in stripping position. At the bottom of hole 51 is the end of chute 52 which delivers the stripped scrap rings 71 from the machine into a suitable receptacle, not shown. The block 50 has ways in which tapered jaws 53 are slidable. Springs 55 operate between holes in the jaws 53 and plates 57 suitably screwed to the block 50. These urge jaws 53 inwardly. The jaws are permitted a reciprocating motion within the limits of keyways 61 in which are positioned set screws 56.

The slidable jaws 53 are held in their ways by plates 57 and 58 suitably screwed to the block 50. The jaws 53 have a main bevel 63 curved laterally to form generally conical surfaces as indicated; the jaws have prongs 59 which have vertical end surfaces except for a small bevel 62 near the top. The prongs 59 are connected by a curved surface 64 at the lower end of the main bevel 63, as indicated particularly in Fig. 13.

It will be understood that, as the trimming punch 13 descends, the tapered nose 38 rides down the tapered surface 63, forcing the jaws apart; the jaws ride over the scrap ring 71 until prongs 59 engage shank 45 as indicated in Figs. 10 and 13. As the punch 13 rises, the jaws slip into the space between the scrap ring 71 and the swaging shoulder 42, to strip the swage ring from the punch with further upward movement of the punch.

The operation of the press will now be described.

It will be assumed that the press is just starting up with the first blank 70 fed to the nesting seat 24 in Fig. 1 and with the head 11 in raised position. As the head 11 moves downwardly, the extrusion punch 12 cups the square blank 70 and then extrudes it to form the product shown in Fig. 2 which represents the lowermost position of the extrusion punch 12. The product shown in Fig. 2 comprises the end product 72 of the machine plus the attached scrap ring 71.

The head 11 then rises to its uppermost position after which it shifts to the left in Fig. 1 as indicated by arrows A and B. This shifts extrusion plunger 12 from axis Y to axis Z and shifts the trimming punch 13 from axis X to axis Y. The head 11 now descends.

When the head 11 descends, trimming punch 13 passes into the extrusion die 14 as indicated in Fig. 4. Further downward movement of punch 13 severs the end product 72 from the scrap ring 71. The shearing flange 39 and extrusion flange 28 provide shearing surfaces to accomplish this result.

The downward pass or throw of the head is such that the trimming punch 13 continues downwardly, causing the swaging surface 42 to squeeze the scrap ring 71 against the squeeze surface 27. This causes the metal of the scrap ring to flow against the shank recess 40 as indicated in Fig. 7, and causes any excess of metal in the scrap ring to flow into the overflow notches 43. Some of the excess metal may squeeze down between the extrusion flange 28 and the shank recess 40 in the form of a thin fin, as indicated in Fig. 7.

Fig. 7 represents the downmost position of the trimming punch 13. As the head rises, the trimming punch slides upwardly within the scrap ring 71 until the scrap ring engages the small bevel 41, at which point the trimming punch carries the scrap ring upwardly along the bore 26 of the extrusion ring 19. The trimming punch carries the scrap ring to the uppermost position of the trimming punch. The head 11 then slides horizontally, as indicated by the arrows A and B in Fig. 1, to bring the trimming punch 13 back to the X-axis and the extrusion punch 12 back to the Y-axis, to the positions shown in Fig. 1. The head 11 then descends; the trimming punch 13 passes into the stripping jaws, as shown in Fig. 9. The tapering shape of the jaws permits the trimming punch to pass through the jaws, forcing the jaws apart, to the position shown in Fig. 10, which indicates the lowermost position of the trimming punch 13.

As the punch 13 moves upwardly, the stripping jaws 53 spring into the space between the scrap ring 71 and the swage surface 42, as illustrated in Fig. 11, and as the head 11 further rises, the scrap ring 71 is stripped from the trimming punch, falling into the delivery chute 52, as illustrated particularly in Fig. 12.

It will be understood that, as the trimming punch 13 passes through the stripping apparatus, the extrusion plunger 12 passes into the extrusion die to cup and extrude a new blank.

Thus a construction and method of operation has been described which overcomes the disadvantages of the prior art. The swaging surface swages part of the metal in the scrap ring inwardly so that the inner diameter of this ring fits tightly against the recessed shank of the punch. Any excess metal due to variations from blank to blank is swaged into the overflow flutes or notches and thus avoids building up tremendous pressures which would arise, were all of the excess metal to be pushed against the punch only without relief provision. The swaging helps to loosen or weaken the bond between the outer diameter of the scrap ring and the cylindrical die surface, thus making it easier to raise the scrap ring out of the die. All dependence upon the spring-back of a thick metal ring to engage into the punch recess after the severing operation, is eliminated. Positive pick-up of the scrap ring is assured and accidental slipping of the scrap ring off the punch is prevented.

The present invention is applicable to brass products. It is also applicable to aluminum, steel and other metals which have less spring-back than brass.

The use of the present invention makes possible high speed, automatic feeding, extrusion and trimming without any interruption due to failure of the trimming punch to pick up the scrap ring or due to the scrap ring prematurely loosening and falling off the trimming punch.

While certain novel features of the invention have been disclosed herein, and are pointed out in the annexed claims, it will be understood that various omissions, substitutions and changes may be made by those skilled in the art without departing from the spirit of the invention.

What is claimed is:

1. In a press, an extrusion die having a cylindrical bore with an annular shoulder having a squeeze surface located within the bore, said die being adapted to hold an extruded product having a scrap ring engaging said squeeze surface, a trimming punch having an annular shear edge, a shank recess above said shear edge, and a swaging shoulder above said shank recess; said shear edge having shearing relationship with the edge of said bore shoulder and serving, upon downward movement of said punch into said bore, to sever the product from the scrap ring, said swaging shoulder being axially aligned with said bore shoulder and serving, upon the said same downward movement of the punch, to squeeze the scrap ring against the squeeze surface, to cause the metal of the scrap ring to flow into said shank recess and overlap said shear edge; whereby, upon upward movement of the punch, the punch carries a positively interlocked scrap ring with it.

2. The press according to claim 1 in which the swaging shoulder has overflow notches to receive excess metal from the scrap ring which does not flow into the shank recess.

3. The press according to claim 1 in which both said annular squeeze surface and said annular swaging shoulder are beveled downwardly and inwardly, and said punch has a conical nose below and adjoining the shear edge.

References Cited in the file of this patent

UNITED STATES PATENTS

| | | |
|---|---|---|
| 37,189 | Westlake | Dec. 16, 1862 |
| 354,412 | Harrington | Dec. 14, 1886 |
| 708,675 | Stuparich | Sept. 9, 1902 |
| 962,714 | Meier | June 28, 1910 |
| 1,352,194 | Hooker | Sept. 7, 1920 |
| 1,452,535 | Sultemeyer | Apr. 24, 1923 |
| 1,458,294 | Hook | June 12, 1923 |
| 1,494,423 | Jessen | May 20, 1924 |
| 1,549,834 | Hicks | Aug. 18, 1925 |
| 1,638,995 | Hodge | Aug. 16, 1927 |
| 1,753,632 | William et al. | Apr. 8, 1930 |
| 2,142,704 | Sparks | Jan. 3, 1939 |
| 2,289,177 | Chandler | July 7, 1942 |
| 2,403,183 | Lefere | July 2, 1946 |
| 2,522,440 | Freter | Sept. 12, 1950 |

FOREIGN PATENTS

| | | |
|---|---|---|
| 793 | Great Britain | of 1909 |
| 231,018 | Germany | Feb. 13, 1911 |